(12) United States Patent
Gotsu

(10) Patent No.: US 8,652,383 B2
(45) Date of Patent: Feb. 18, 2014

(54) INSERT PART WELD MOLDING METHOD

(75) Inventor: Hidesaburo Gotsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 12/988,214

(22) PCT Filed: Feb. 10, 2009

(86) PCT No.: PCT/JP2009/000523
§ 371 (c)(1),
(2), (4) Date: Oct. 15, 2010

(87) PCT Pub. No.: WO2009/128190
PCT Pub. Date: Oct. 22, 2009

(65) Prior Publication Data
US 2011/0037203 A1 Feb. 17, 2011

(30) Foreign Application Priority Data

Apr. 16, 2008 (JP) .................................. 2008-106286
Jul. 7, 2008 (JP) .................................. 2008-176964

(51) Int. Cl.
*B29C 45/14* (2006.01)
*B29C 49/20* (2006.01)
*B29C 33/14* (2006.01)
*B29K 105/20* (2006.01)

(52) U.S. Cl.
USPC ........... 264/265; 264/241; 264/259; 264/263; 264/267; 264/268; 264/271.1; 264/274; 264/275; 264/516; 264/523

(58) Field of Classification Search
USPC ............. 264/241, 259, 263, 271.1, 274, 275, 264/279.1, 500, 523, 524, 265, 267, 268, 264/516; 220/86.1, 562
See application file for complete search history.

(56) References Cited

U.S. PATENT DOCUMENTS 3,334,771 A * 8/1967 Branscum ...................... 220/288
5,103,865 A * 4/1992 Hyde ............................. 137/588

(Continued)

FOREIGN PATENT DOCUMENTS

| JP | 59-143714 | | 9/1984 |
| JP | 62-126923 | | 8/1987 |
| JP | 62-126923 U | * | 8/1987 |
| JP | 07-178765 | | 7/1995 |
| JP | 08-268057 | | 10/1996 |

(Continued)

*Primary Examiner* — Atul P. Khare
(74) *Attorney, Agent, or Firm* — Rankin, Hill & Clark LLP

(57) ABSTRACT

To provide an insert part weld molding method for reliably welding an insert part to a blow molded object while preventing an unwelded portion from being created at a circumferential edge of the insert part in a thickness direction thereof. An insert part weld molding method welds a blow molded object to an insert part 3 set in a mold 7, wherein a molding surface 7a of the mold 7 is set higher than a front surface 6d of a portion to be welded of the insert part 3, and an entire surface of a circumferential edge 6b of the insert part 3 in the thickness direction thereof and a parison 11 of the blow molded object are brought into a gapless welded state. Also adopted is a method of suppressing a decrease in temperature of the insert part 3 by arranging a preheating plate 8 which is made of a high thermal conducting material and which is to become a part of the molding surface 7a of the mold 7 in a vicinity of a portion where the parison 11 and the circumferential edge 6b of the insert part 3 in the thickness direction thereof are welded, and arranging a heat insulating plate 9 between the preheating plate 8 and the mold 7.

5 Claims, 4 Drawing Sheets

(56) References Cited

U.S. PATENT DOCUMENTS 5,104,472 A * 4/1992 Kasugai et al. ............... 156/245
6,415,941 B1 * 7/2002 Huse ............................. 220/562
7,287,518 B2 * 10/2007 Tsuruta ......................... 123/516
7,476,354 B2 * 1/2009 Clack ............................ 264/516

FOREIGN PATENT DOCUMENTS

| JP | 11-138620 | | 5/1999 |
| JP | 2003-236920 | | 8/2003 |
| JP | 2008284746 A | * | 11/2008 |
| WO | WO 2007081770 A2 | * | 7/2007 |

* cited by examiner

INSERT PART WELD MOLDING METHOD

TECHNICAL FIELD

The present invention relates to an insert part weld molding method for welding various insert parts to a blow molded object such as the fuel tank of a motorcycle.

BACKGROUND ART

As a conventional insert part weld molding method, a method is known in which by chamfering a circumferential edge of a welding bed provided in a flange-like shape on a welded portion of an insert part, the welding bed is brought into close contact with and welded to an expanding parison during molding of a blow molded object (fuel tank) (for example, refer to Patent Document 1).

Patent Document 1: Japanese Patent Application No. 2003-236920

DISCLOSURE OF THE INVENTION

Problems to be Solved by the Invention

In the conventional insert part weld molding method, the insert part is set to a mold during blow molding of the fuel tank, and the parison is brought into close contact with and welded to the welding bed of the insert part during the closing of the mold.

However, as illustrated in FIG. 7, there may be cases where a vertical wall 101 is provided at a circumferential edge of an insert part 100 in a thickness direction thereof and a section 103 exists that is not welded to a parison 102. In addition, when a preheating temperature of the insert part and a preheating plate temperature are respectively set high in order to improve welding of the circumferential edge of the insert part in the thickness direction thereof, the insert part melts and a molding failure occurs.

The present invention has been made in consideration of such problems, and an object thereof is to provide an insert part weld molding method for reliably welding an insert part to a blow molded object while preventing an unwelded portion from being created at a circumferential edge of the insert part in a thickness direction thereof.

Means for Solving the Problems

In order to solve the problems described above, an invention according to claim 1 is an insert part weld molding method for welding a blow molded object to an insert part set in a mold, wherein a molding surface of the mold is set higher than a front surface of a portion to be welded of the insert part, and an entire surface of a circumferential edge of the insert part in the thickness direction thereof and a parison of the blow molded object are brought into a gapless welded state.

An invention according to claim 2 is the insert part weld molding method according to claim 1, wherein the parison is welded in an overhanging (overlying) state with respect to the circumferential edge of the insert part in the thickness direction thereof.

An invention according to claim 3 is the insert part weld molding method according to claim 1 or 2, wherein a preheating plate which is made of a high thermal conducting material and which is to become a part of the molding surface of the mold is arranged in a vicinity of a portion where the parison and the circumferential edge of the insert part in the thickness direction thereof are welded, and a heat insulating plate is arranged between the preheating plate and the mold.

An invention according to claim 4 is the insert part weld molding method according to claim 3, wherein a level difference is formed on the preheating plate by an inclined surface, and the level difference by the inclined surface causes the parison to assume an overhanging state with respect to the circumferential edge of the insert part in the thickness direction thereof.

Advantages of the Invention

With the invention according to claim 1, the circumferential edge of the insert part in the thickness direction thereof can be reliably welded to the blow molded object while preventing a portion unwelded to the blow molded object from being created at the circumferential edge of the insert part in the thickness direction thereof.

With the invention according to claim 2, since the parison is welded in an overhanging state with respect to the circumferential edge of the insert part in the thickness direction thereof, the blow molded object envelopes the circumferential edge of the insert part and enables the insert part to be reliably welded to the blow molded object.

With the invention according to claim 3, the preheating plate with superior thermal conductivity and the heat insulating plate for suppressing a decrease in temperature ensure a reliable welding of the insert part to the blow molded object.

With the invention according to claim 4, since the level difference of the preheating plate created by the inclined surface causes the parison to assume an overhanging state with respect to the circumferential edge of the insert part in the thickness direction thereof, the blow molded object envelopes the circumferential edge of the insert part and enables the insert part to be reliably welded to the blow molded object.

DESCRIPTION OF SYMBOLS

1 . . . motorcycle fuel tank, 2 . . . tank main body (blow molded object), 3 . . . fuel intake main body (insert part), 3a . . . screw portion, 4 . . . cap, 6 . . . flange portion, 6a . . . rear surface, 6b . . . circumferential edge in thickness direction, 6c . . . tapered portion, 6d . . . front surface, 7 . . . mold, 7a . . . molding surface, 8 . . . preheating plate, 8a . . . inclined surface, 9 . . . heat insulating plate, 10 . . . level difference, 11 . . . parison, 11a . . . overhanging portion, 12 . . . air.

BEST MODE FOR CARRYING OUT THE INVENTION

Figure 1:
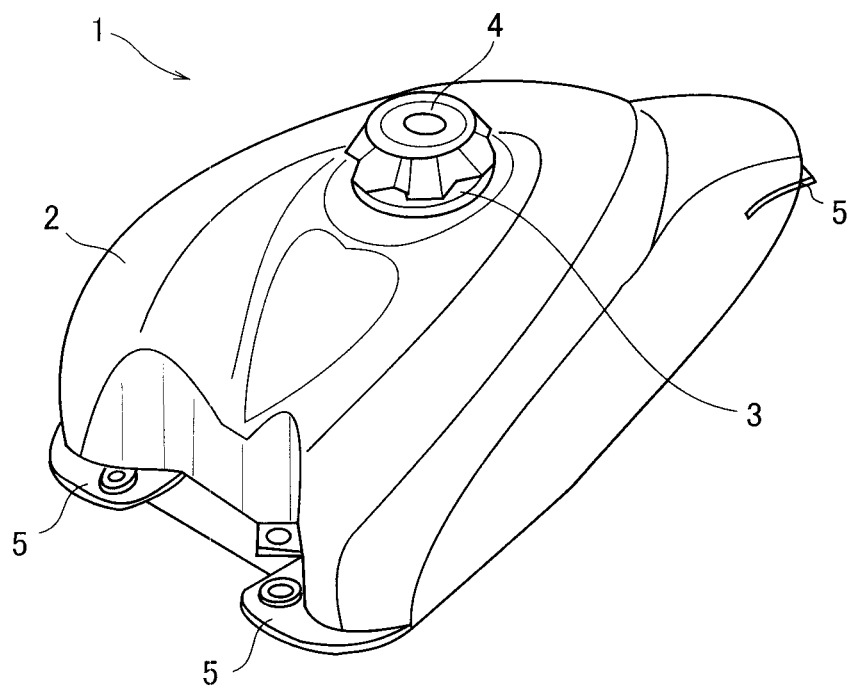
FIG. 1 is a perspective view of a motorcycle fuel tank to which the insert part weld molding method according to the present invention is applied.
Figure 2:
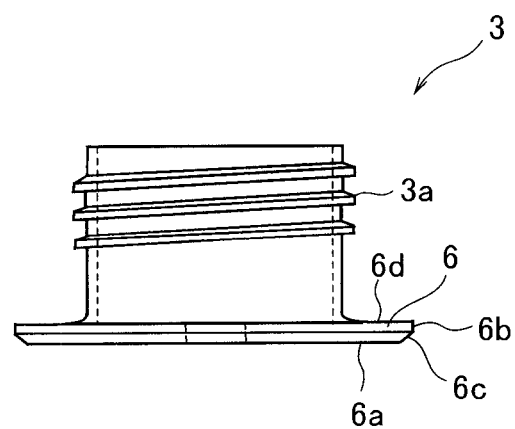
FIG. 2 is a side view of a fuel intake main body.
Figure 3:
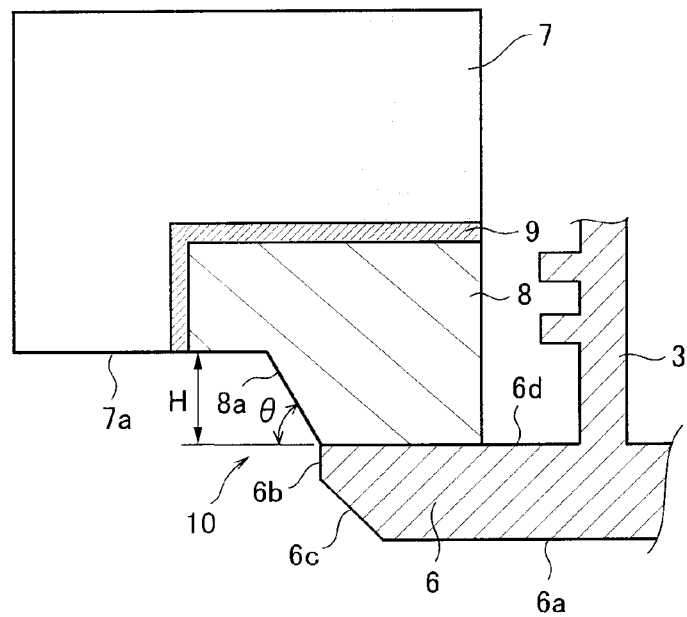
FIG. 3 is a schematic cross-sectional view of a mold structure for implementing a first embodiment of the insert part weld molding method according to the present invention.
Figure 4:
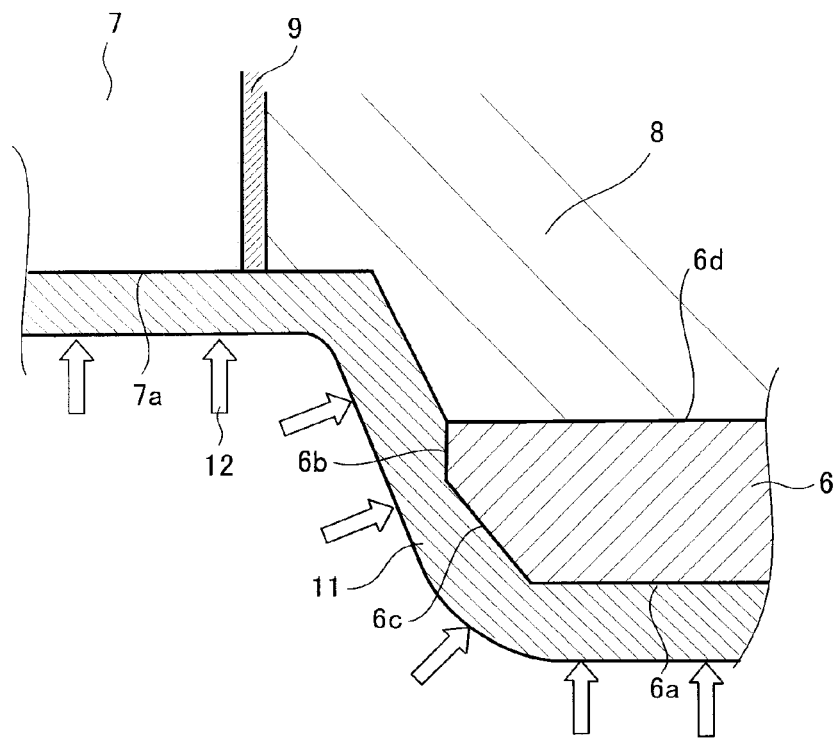
FIG. 4 is an operation explanatory diagram of the first embodiment.
Figure 5:
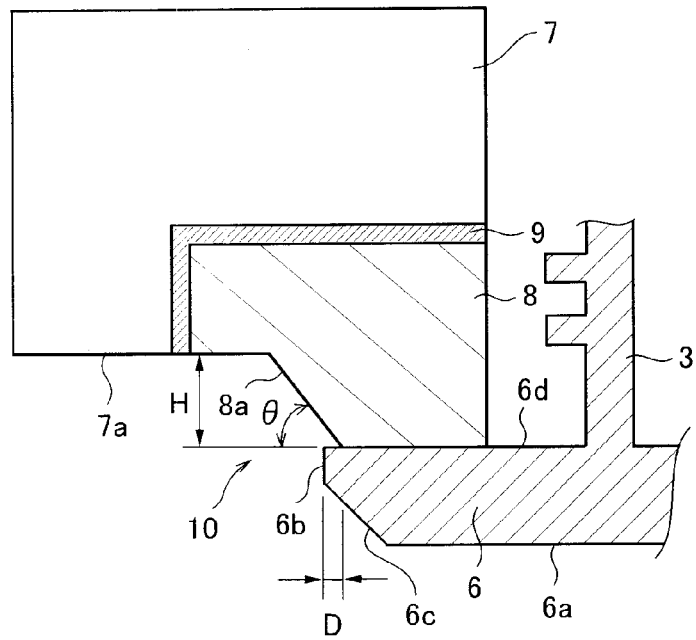
FIG. 5 is a schematic cross-sectional view of a mold structure for implementing a second embodiment of the insert part weld molding method according to the present invention.
Figure 6:
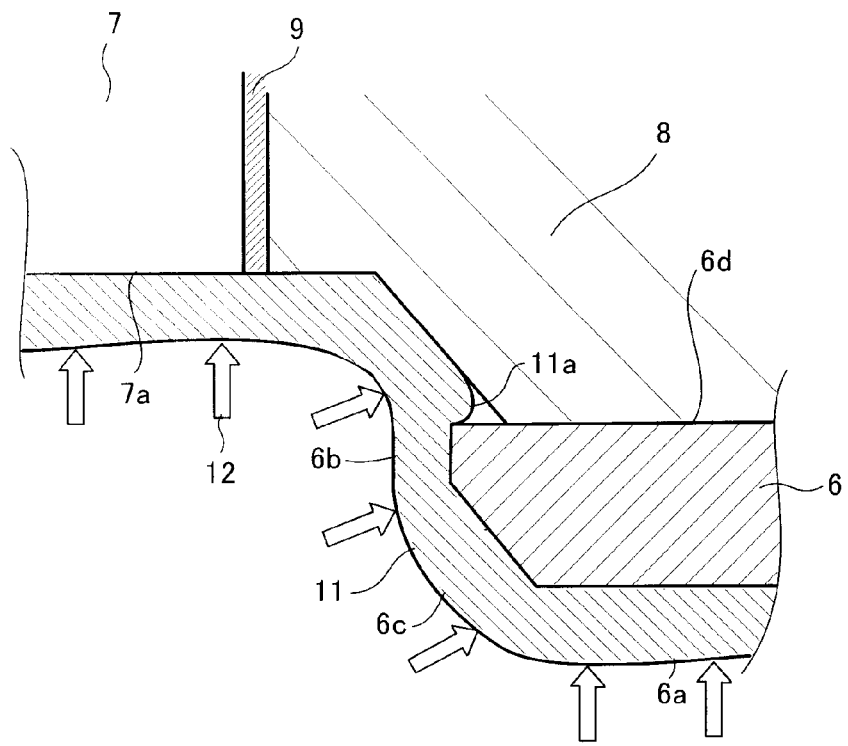
FIG. 6 is an operation explanatory diagram of the second embodiment.
Figure 7:
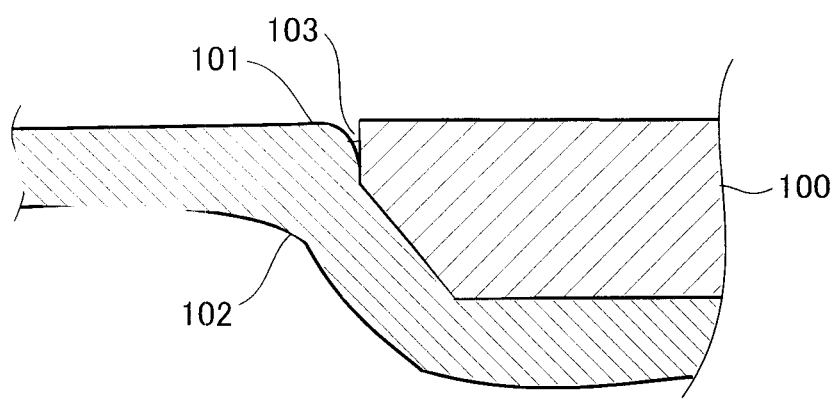
FIG. 7 is a cross-sectional view of a welded portion according to conventional art.

Hereinafter, embodiments of the present invention will be described with reference to the accompanying drawings, in which: FIG. 1 is a perspective view of a motorcycle fuel tank to which the insert part weld molding method according to the present invention is applied; FIG. 2 is a side view of a fuel intake main body; FIG. 3 is a schematic cross-sectional view of a mold structure for implementing a first embodiment of the insert part weld molding method according to the present invention; FIG. 4 is an operation explanatory diagram of the first embodiment; FIG. 5 is a schematic cross-sectional view of a mold structure for implementing a second embodiment of the insert part weld molding method according to the present invention; and FIG. 6 is an operation explanatory diagram of the second embodiment.

As illustrated in FIG. 1, in a motorcycle fuel tank 1 to which the insert part weld molding method according to the present invention is applied, a fuel intake main body 3 that is an insert part is welded to the highest point on the top surface of a tank main body 2. A cap 4 detachably screws onto the fuel intake main body 3. Reference numeral 5 denotes a bracket which is used for mounting the tank main body 2 to a vehicle body frame and which is to be welded to a parison that becomes the tank main body 2 in the same manner as the fuel intake main body 3 during blow molding of the tank main body 2.

As illustrated in FIG. 2, the fuel intake main body 3 is an approximately cylindrical resin product, in which a flange portion 6 is formed on a proximal end portion of the fuel intake main body 3, and a screw portion 3a onto which the cap 4 screws is formed on an outer circumferential surface of the fuel intake main body 3. In addition, a tapered portion 6c is formed on a rear surface 6a of the flange portion 6 so as to become thinner towards a circumferential edge 6b of the flange portion 6 in the thickness direction thereof.

As illustrated in FIG. 3, in the first embodiment of the insert part weld molding method according to the present invention, the fuel intake main body 3 is set on a preheating plate 8 arranged as a portion of a molding surface 7a of the mold 7. The preheating plate 8 is arranged so as to come into close contact with a front surface 6d of the flange portion 6. A level difference 10 with a height H is formed on the preheating plate 8 by an inclined surface 8a with an angle θ that rises from the circumferential edge 6b of the flange portion 6 in the thickness direction thereof (for example, angle θ=45°, height H of level difference=1 mm). In addition, a heat insulating plate 9 for suppressing a decrease in temperature is arranged between the mold 7 and the preheating plate 8.

Next, as illustrated in FIG. 4, a parison 11 that is a preformed body made of a thermoplastic resin is pushed into a cavity in the mold 7, and air 12 at a predetermined pressure is blown into the parison 11 (blow molding). Consequently, the parison 11 expands and presses against the molding surface 7a of the mold 7, the inclined surface 8a of the preheating plate 8, the rear surface 6a of the flange portion 6, and the like. Subsequently, the parison 11 to become the tank main body 2 and the flange portion 6 enter a completely-welded state from the circumferential edge 6b of the flange portion 6 in the thickness direction thereof to the tapered portion 6c, and to the rear surface 6a.

In this manner, since the parison 11 enters a completely-welded state with the circumferential edge 6b of the flange portion 6 in the thickness direction thereof without forming an unwelded portion, improvements in welding strength (tensile strength), impact strength (impact by a drop at low temperature), and the like can be achieved.

As illustrated in FIG. 5, in the second embodiment of the insert part weld molding method according to the present invention, a fuel intake main body 3 is set on a preheating plate 8 arranged as a portion of a molding surface 7a of a mold 7. The preheating plate 8 is arranged so as to come into close contact with a front surface 6d of a flange portion 6. A level difference 10 with a height H is formed on the preheating plate 8 by an inclined surface 8a with an angle θ that rises from a central axis-side of the fuel intake main body 3 displaced by a distance D from the circumferential edge 6b of the flange portion 6 in the thickness direction thereof (for example, angle θ=45°, height H of level difference=1 mm, distance D=0.5 mm). In addition, a heat insulating plate 9 for suppressing a decrease in temperature is arranged between the mold 7 and the preheating plate 8.

Next, as illustrated in FIG. 6, a parison 11 that is a preformed body made of a thermoplastic resin is pushed into a cavity in the mold 7, and air 12 at a predetermined pressure is blown into the parison 11 (blow molding). Consequently, the parison 11 expands and presses against the molding surface 7a of the mold 7, the inclined surface 8a of the preheating plate 8, a rear surface 6a of the flange portion 6, and the like. Subsequently, the parison 11 assumes an overhanging state with respect to the circumferential edge 6b of the flange portion 6 in the thickness direction thereof to form an overhanging portion 11a, and the parison 11 to become the tank main body 2 and the flange portion 6 enter a completely-welded state at the front surface 6d in the vicinity of the circumferential edge 6b of the flange portion 6 in the thickness direction thereof from the circumferential edge 6b in the thickness direction to a tapered portion 6c, and to the rear surface 6a.

In this manner, since the parison 11 assumes an overhanging state with respect to the circumferential edge 6b of the flange portion 6 in the thickness direction thereof to form an overhanging portion 11a and the parison 11 enters a completely-welded state with the circumferential edge 6b of the flange portion 6 in the thickness direction thereof without forming an unwelded portion, improvements in welding strength (tensile strength), impact strength (impact by a drop at low temperature), and the like can be achieved.

INDUSTRIAL APPLICABILITY

According to the present invention, an insert part weld molding method can be provided that is capable of reliably welding an insert part to a blow molded object while preventing an unwelded portion from being created at a circumferential edge of the insert part in a thickness direction thereof.

The invention claimed is:

1. An insert molding method comprising the steps of:
   positioning a front flange surface of a fuel intake insert against a preheating plate of a blow mold, the insert comprising a screw portion extending from said front surface, a rear flange surface opposing said front surface and facing a cavity of the blow mold, and a circumferential edge which is located between said front and rear surfaces and which forms a corner with said front surface, wherein the positioning leaves a portion of said front surface exposed to the mold cavity;
   forming a tank main body by blow molding a parison within said mold cavity and against the positioned insert, the blow molding forcing the parison into direct contact with said back surface, circumferential edge, and exposed front surface portion of the insert so as to envelope said circumferential edge and overhang said corner; and forming a complete, gapless weld between the tank main body and the insert at both the front flange surface and circumferential edge thereof by applying heat to said positioned insert by said preheating plate during said blow molding.

2. The method according to claim 1, wherein the preheating plate is made of a high thermal conducting material and forms a portion of a cavity surface of the mold, and wherein a heat insulating plate is arranged between the preheating plate and a remainder of the mold.

3. The method according to claim 1, wherein the preheating plate forms a portion of a cavity surface of the mold, and wherein the preheating plate extends at an incline away from a remainder of the cavity surface so as to leave said front surface portion of the positioned insert exposed to the mold cavity.

4. The method according to claim 3, wherein said incline is at 45°.

5. The method according to claim 3, wherein said blow molding forces the parison also against said incline of the preheating plate.

* * * * *